United States Patent Office 3,098,878
Patented July 23, 1963

3,098,878
SYNTHESIS OF METHYLENE BIS(PHOSPHONIUM BROMIDES)
John E. Harris, Hyde Park, and Clifford N. Matthews, Winchester, Mass., assignors to Monsanto Research Corporation, St. Louis, Mo., a corporation of Delaware
No Drawing. Filed Jan. 16, 1962, Ser. No. 166,682
7 Claims. (Cl. 260—606.5)

This invention relates to phosphonium compounds, and more particularly provides a novel method of making methylene bis(trihydrocarbylphosphonium bromide) compounds.

Accepted principles of phosphonium salt formation are followed in making a methylene bis(phosphonium bromide) by reacting methylene dibromide with the selected trihydrocarbyl phosphine. Just as a single halogen atom becomes the phosphonium salt anion on reaction of a methyl mono-halide with a phosphine, so do both the halogens become the anions of a bis-phosphonium salt when methylene dibromide is used, the reaction proceeding in accordance with the equation.

$$CH_2Br_2 + 2R_3P \rightarrow CH_2(R_3P^+Br^-)_2$$

It would be expected that other polyhalomethanes would react similarly and thus that a compound such as $CH_2ClBr$ would form a methylene (trihydrocarbylphosphonium bromide) (trihydrocarbylphosphonium chloride) in accordance with the equation $$CH_2BrCl + 2R_3P \rightarrow CH_2(R_3P^+Br^-)(R_3P^+Cl^-)$$

where R represents a hydrocarbon radical.

It has now been found that reacting a trihydrocarbyl phosphine with a polyhalomethane selected from the class consisting of $CH_2ClBr$, $CHCl_2Br$, $CHClBr_2$ and $CHBr_3$ unexpectedly produces a methylene bis(trihydrocarbylphosphonium bromide) of the formula $CH_2(R_3P^+Br^-)_2$ where R is a hydrocarbon radical.

Thus, instead of following the above illustrated expected course, the reaction of $CH_2BrCl$ with a trihydrocarbylphosphine such as triphenylphosphine produces a bis(phosphonium bromide) as illustrated by the following equation $$CH_2BrCl + 2R_3P \rightarrow CH_2(R_3P^+Br^-)_2$$

Even more unexpectedly, it is found that the reaction of a trihalomethane such as $CHBr_2Cl$ or $CHBrCl_2$ also produces a methylene bis(trihydrocarbylphosphonium bromide). In this case, not only is there an exchange of ionic chlorine for ionic bromine, but there is furthermore an exchange of covalently bonded halogen for hydrogen. This is particularly surprising since a bromomethylene bis(trihydrocarbylphosphonium halide) is quite capable of existence: it can be prepared by a route other than reaction of the halomethane with the trihydrocarbyl phosphine, and has been isolated by such an alternative procedure. And the anomalous result which is the subject of this invention has also been observed, under conditions as stated hereafter, with bromoform, where the methane is free of chlorine.

The method of the invention may be practiced with a variety of trihydrocarbyl phosphines. In general, the hydrocarbon radical in such trihydrocarbyl phosphines will be a hydrocarbon radical free of aliphatic (olefinic or acetylenic) carbon-to-carbon unsaturation. Each hydrocarbon radical may contain up to 12 carbon atoms, and may include from 1 to 2 aromatic rings. Thus, for example, phosphines which may be employed in practicing the method of the invention include, for example, tributylphosphine, tris(2-ethylhexyl)phosphine, triethylphosphine, methyldibutylphosphine, tricyclohexylphosphine, methyldiphenylphosphine, triphenylphosphine, tri-p-tolylphosphine, trinaphthylphosphine, tris(biphenyl)phosphine, phenyldi-m-tolylphosphine, tris(p-butylphenyl)phosphine and so forth. The triarylphosphines, and especially those wherein the carbon atoms bonded to phosphorus are aromatic, such as triphenylphosphine, are preferred.

To effect the anomalous formation of a methylene bis(trihydrocarbylphosphonium bromide) in accordance with this invention, the phosphine will be contacted with the halomethane under conditions conducive to formation of a polyphosphonium salt. In general, these conditions are an elevated temperature, above about room temperature, to promote reaction of the phosphine with the halomethane, and desirably, though not necessarily, use of an excess of the phosphine to promote formation of the polyphosphonium, rather than the monophosphonium salt.

For bromochloromethane, simply heating the halomethane with the phosphine, with or without a solvent, at the reflux temperature of the reaction mixture is sufficient to produce a substantial yield of the methylene bis(phosphonium bromide). When the trihalomethanes are employed, at low temperatures there is a tendency to form only the monophosphonium salt and indeed with bromoform, in a reaction mixture consisting essentially of bromoform and a triaryl phosphine, the product of reflux temperatures consists substantially entirely of the monophosphonium salt. However, at more elevated temperatures reached by use of a solvent for the reaction mixture, the conditions necessary to drive the reaction further, to form a polyphosphonium salt, are achieved. Solvents favoring the anomalous formation of a methylene bis(phosphonium bromide) in accordance with this invention are those which permit conducting the reaction at temperatures substantially more elevated than the reflux temperature of the halomethanetrihydrocarbylphosphine mixture. It may further be desirable that the solvent have an ability to dissolve the monophosphonium salt produced by the reaction, thereby enabling it to remain in contact with the phosphine and undergo further reaction to form the polyphosphonium salt. A variety of solvents or diluents may be used in this connection. These may be non-polar relatively high boiling liquids such as hydrocarbons like diethylbenzene, tetralin, decalin, diphenylmethane, biphenyl and the like. Advantageously, they may be highly polar high-boiling liquids of high solvent power such as phosphate esters like tricresyl phosphate, triphenyl phosphate, tris(2,4-dimethylphenyl)phosphate, tris(4-tert-butylphenyl)phosphate, and so forth. The useful ester solvents are fully esterified phosphates melting at a temperature below about 100° C. and boiling above about 150° C., and preferably triaryl phosphates.

Another method of providing conditions favoring production of polyphosphonium salts consists in contacting the reactants, in the presence or absence of solvents, at elevated temperatures such as temperatures above about 150° C. This may be accomplished by conducting the reaction under superatmospheric pressure, for example. In this connection, the pressures employed may be the autogenous pressure produced by heating the reaction mixture above about 150° C., or pressure may be applied, to maintain the reaction mixture at pressures such as 500 to 5000 pounds per square inch.

As noted above, the formation of the methylene bis(phosphonium bromide) product may be accompanied by formation of the corresponding monophosphonium salt, and isolation of the methylene bis(phosphonium bromide) product may include its separation from such an accompanying product. Known methods of separation such as selective solvent extraction may be employed to effect this.

Exemplary of methylene bis(phosphonium bromide) salts which may be produced by the method of this invention are methylene bis(triphenylphosphonium bromide), methylene bis(tri-p-tolylphosphonium bromide), methylene bis(tri-p-xylylphosphonium bromide), methylene bis(trinapththylphosphonium bromide), methylene bis(tribiphenylphosphonium bromide), methylene bis(tri-(p-isopropylphenyl)phosphonium bromide) methylene bis(tributylphosphonium bromide), methylene bis(tripropylphosphonium bromide), methylene bis(diphenylpropylphosphonium bromide), and so forth.

The invention is illustrated but not limited by the following examples.

Example 1

This example illustrates formation of a methylene bis-(phosphonium bromide) from a chlorobromomethane.

While 130 grams (g.) (1.0 mole) of bromochloromethane is gently refluxed under nitrogen with stirring, a solution of 131 g. (0.5 mole) triphenylphosphine in 130 g. (1.0 mole) of bromochloromethane is added slowly, over a period of an hour. The reaction mixture is refluxed for 10 hours and then cooled. Addition of 200 milliliters (ml.) ether precipitates solid which is separated, washed twice with 200 ml. portions of ether, and then recrystallized twice from methanol and ethyl acetate. This product, M. 275° C., is identified by infrared spectrum as methylene bis(triphenylphosphonium bromide), of the formula

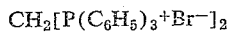

$$CH_2[P(C_6H_5)_3{}^+Br^-]_2$$

When the stated procedure is repeated on a larger scale, doubling the amounts of each reactant, the same result is produced. Identification of the product as

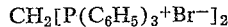

$$CH_2[P(C_6H_5)_3{}^+Br^-]_2$$

is corroborated by elemental analysis, showing that the product is the dibromide salt, free of chlorine.

Example 2

This example illustrates use of a solvent in the production of a methylene bis(phosphonium bromide) from bromochloromethane.

A solution of 65 g. (0.5 mole) bromochloromethane in 400 ml. dry benzene is refluxed gently under nitrogen with stirring while 131 g. (0.5 mole) of triphenylphosphine in 300 ml. dry benzene is added over a period of 1½ hours, and refluxing is continued for 10 hours. The reaction mixture is filtered to remove 5 g. of solids, and then further refluxed at 80° C. for some 48 hours.

The resulting precipitate is recrystallized from methanol and ethyl acetate, and is identified as

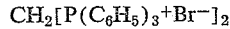

$$CH_2[P(C_6H_5)_3{}^+Br^-]_2$$

Example 3

This example illustrates production of a methylene bis(phosphonium bromide) from dibromochloromethane.

A mixture of 131 g. (0.5 mole) of triphenylphosphine and 145 g. (0.7 mole) of dibromochloromethane in 300 ml. of diethylbenzene is stirred under nitrogen while it is heated to about 170° C. over about 1 hour. The liquid layer is decanted off and the reaction mixture residue is found to comprise a material insoluble in an isopropanol/acetone 2:10 mixture, which melts at 288–289° C., has an infrared analysis corresponding to that of methylene bis(triphenylphosphonium bromide), and elemental analysis corroborating this identity.

Calc.: 63.7% C, 4.6% H, 8.9% P, 22.9% Br (ionic), 0% Cl. Found: 63.44% C, 5.29% H, 8.84% P, 22.49% Br (total), 22.26% Br (ionic), 0% Cl.

Example 4

This example illustrates formation of a methylene bis-(phosphonium bromide) from bromodichloromethane.

A mixture of 131 g. (0.05 mole) of triphenylphosphine and 300 ml. of diethylbenzene is stirred under nitrogen and heated to about 180° C. while 164 g. (1.0 mole) of bromodichloromethane is added dropwise over a period of about 3 hours. Heating and stirring is continued for 2 hours and then the reaction mixture is cooled. The liquid layer is decanted off and the residue is found to comprise a material which can be recrystallized from isopropanol. It melts at 288–289° C., has an infrared sample corresponding to that of methylene bis(triphenylphosphonium bromide), and has a corresponding elemental analysis.

Calc.: 63.7% C, 4.6% H, 8.87% P, 22.9% Br (ionic), 0% Cl. Found: 63.77% C, 5.10% H, 8.87% P, 22.26% Br (total), 22.16% Br (ionic), 0% Cl.

Methylene bis(tributylphosphonium bromide) is prepared proceeding similarly, but substituting a molar equivalent of tributylphosphine for triphenylphosphine.

Example 5

105 g. (0.4 mole) of triphenylphosphine and 326 g. (1.0 mole) of triphenylphosphate are stirred together under nitrogen for 1 hour and heated to 60° to form a pale clear yellow liquid. Then 25 g. bromoform (0.1 mole) is added with stirring under nitrogen. The pale yellow solution is gradually raised to a temperature of 160° C. for a further 1½ hours. Now 500 ml. of dried benzene is added with stirring under nitrogen while the reaction mixture is heated to 60° C. on the water box. The benzene layer is decanted, and the residue from the decantation is warmed with 500 ml. of warm methylene dichloride and filtered. Ethyl acetate is slowly added to the filtrate to produce precipitation of a salt identified as methylenebis(triphenylphosphonium bromide), of the formula $CH_2[P(C_6H_5)_3{}^+Br^-]_2$.

While the invention has been illustrated with reference to various particular preferred embodiments thereof it is to be appreciated that modifications and variations can be made without departing from the scope of the invention as defined in the following claims.

What is claimed is:

1. The method of making a methylene bis(trihydrocarbylphosphonium bromide), which comprises contacting a trihydrocarbylphosphine with a halomethane selected from the class consisting of $CH_2ClBr$, $CHCl_2Br$, $CHBr_2Cl$ and $CHBr_3$ under conditions conducive to the formation of a polyphosphonium salt.

2. The method of claim 1 in which said halomethane is substituted by chlorine and bromine.

3. The method of making a methylene bis(triarylphosphonium bromide) which comprises heating a triarylphosphine with bromochloromethane.

4. The method of making a methylene bis(triarylphosphonium bromide) which comprises heating a triarylphosphine with bromodichloromethane.

5. The method of making a methylene bis(triarylphosphonium bromide) which comprises heating a triarylphosphine with dibromochloromethane.

6. The method of making a methylene bis(triarylphosphonium bromide) which comprises heating bromoform with a triarylphosphine, in a high boiling inert solvent.

7. The method of claim 6 in which said solvent is a phosphate ester melting below 100° C.

No references cited.